United States Patent [19]
Smith et al.

[11] Patent Number: 5,566,788
[45] Date of Patent: Oct. 22, 1996

[54] SHOPPING CART BRAKE ASSEMBLY

[75] Inventors: Leonard Smith; Ralph L. Powers, both of Cincinnati, Ohio

[73] Assignee: EPHTEC, Inc., Cincinnati, Ohio

[21] Appl. No.: 394,692

[22] Filed: Feb. 24, 1995

[51] Int. Cl.$^6$ ........................................ B60B 33/00
[52] U.S. Cl. ........................................ 188/1.12
[58] Field of Search ............... 188/1.12, 19, 20; 16/35 R; 280/33.994

[56] References Cited

U.S. PATENT DOCUMENTS

| | | |
|---|---|---|
| 2,096,229 | 10/1937 | Dudley . |
| 2,900,659 | 8/1959 | Snell . |
| 3,493,085 | 2/1970 | Libhart . |
| 3,772,733 | 11/1973 | Stosberg et al. . |
| 4,035,864 | 7/1977 | Schröder . |
| 4,835,815 | 6/1989 | Mellwig et al. . |
| 5,012,550 | 5/1991 | Schlosser ................ 188/1.12 |
| 5,042,622 | 8/1991 | Smith et al. . |
| 5,199,534 | 4/1993 | Goff . |
| 5,236,066 | 8/1993 | O'Neal et al. . |
| 5,383,536 | 1/1995 | Butter ...................... 188/1.12 |

Primary Examiner—Robert J. Oberleitner
Assistant Examiner—Clifford Bartz
Attorney, Agent, or Firm—Wood, Herron & Evans, P.L.L.

[57] ABSTRACT

This invention is directed to a caster wheel foot brake assembly which may be used with casters on items such as shopping carts, strollers, moving carts, furniture and the like.

The brake assembly includes a foot pedal, pair of connector arms, brake arm, U-shaped braking foot and hinge spring which form an overcenter locking mechanism.

In order to engage the braking foot with the caster wheel, the user pushes down on the rear portion of the foot pad, thereby moving the braking foot overcenter in toggle fashion into a releasably locked braking position. In order to disengage the brake, the user may either push down on the front portion of the foot pad or pull back on the shopping cart or other item attached to the caster, thereby moving the braking foot back overcenter into a disengaged nonbraking position.

14 Claims, 1 Drawing Sheet

SHOPPING CART BRAKE ASSEMBLY

BACKGROUND OF THE INVENTION

1. Field of the Invention

This invention relates to caster brake assemblies, and more particularly, to caster brake assemblies for use with shopping carts, strollers, moving carts, furniture and the like.

2. Description of the Related Art

Casters serve a useful purpose by allowing a person to move an item, such as a piece of furniture or a shopping cart, relatively easily. However, one of the challenges associated with the use of casters is that the caster wheels tend to move when the user does not want them to move, and additionally, the caster wheels may be locked when the user wants them to freely rotate.

In an effort to address this challenge, various types of caster brakes have been developed. The different brake assemblies generally require that a user push down on a foot pedal or push button to engage the brake with the caster wheel. However, the assemblies differ in the way in which a user disengages the brake from the caster wheel. With several of the assemblies, the user must carefully place a toe underneath the foot pedal and lift up on the pedal, as exemplified by U.S. Pat. Nos. 2,096,229, 2,900,659 and 3,493,085. Although this method of brake release works, it may be somewhat awkward for the user and is likely to scuff the top of the user's shoe. Therefore, other brake assemblies have been developed which allow a user to disengage the caster brake by pushing down on a portion of the foot pedal, as exemplified by U.S. Pat. Nos. 3,772,733, 4,035,864, 4,835,815, 5,042,622 and 5,236,066.

Yet another method of brake release is presented in U.S. Pat. No. 5,199,534 to Goff. With the '534 device, the user may disengage the brake either by placing a toe underneath the foot pedal and lifting up or by pulling back on the shopping cart or other item attached to the caster. The '534 device includes a connecting arm for connecting the brake to the rear leg of a shopping cart, and a split yoke which is pivotably connected to the connecting arm. The split yoke has two braking flanges which engage and apply frictional force to the sides of the tire to prevent the tire from rotating, and further includes an actuator for applying force to the split yoke to engage the braking flanges with the sides of the tire. The shopping cart brake also includes an adjustable tension bar and a pop-up spring. The tension bar is disposed between the braking flanges and may be used to increase or decrease the frictional force which the braking flanges apply to the tire. The pop-up spring is located between the connecting arm and the split yoke, and biases the split yoke to a normal position when the brake is disengaged. The shopping cart brake is engaged by exerting a downward force on the split yoke actuator with the foot and may be disengaged either by moving the cart in a rearward direction or by placing a toe underneath the split yoke actuator and lifting up on the actuator.

Although the '534 shopping cart brake taught by Goff allows a user to disengage the brake by pulling back on the shopping cart, should the user wish to disengage the brake using a foot, the only way to do so is by placing a toe underneath the split yoke actuator and lifting up on the actuator, which may be somewhat awkward.

Therefore, it is desirable to have a shopping cart brake assembly in which the user has the option to disengage the brake either by pulling back on the shopping cart or by pushing down on a foot pedal.

SUMMARY OF THE INVENTION

This invention is directed to a caster wheel foot brake assembly, which may be used with casters on items such as shopping carts, strollers, moving carts, furniture and the like. The caster wheel foot brake assembly includes a brake housing, a foot pedal, at least one connector arm, a brake arm, a braking foot and a hinge spring. In the preferred embodiment, a second connector arm is used which is adjacent to and parallel with the first connector arm.

The foot pedal has a foot pad and a lever protruding from the undersurface of the foot pad, with the lever being pivotably mounted to the brake housing which is adapted to attach to a caster. Each of the connector arms has a first end and a second end, with the first end being pivotably connected to the lever. The brake arm includes a first end, a middle region and a second end, with the first end being pivotably mounted to the brake housing and the middle region being pivotably attached to the second end of each of the connector arms. The braking foot has a plurality of braking 15 extensions adapted to frictionally engage a caster wheel, with the braking foot being connected to the second end of the brake arm. The hinge spring is designed to exert an angular force between the connector arm and the brake arm.

The foot pedal, connector arm, brake arm, braking foot and hinge spring form an overcenter locking mechanism. When the brake housing is attached to a caster, the locking mechanism is adapted to move the braking foot overcenter in toggle fashion into a releasably locked braking position, frictionally engaging the caster wheel when a first force is exerted on the foot pedal. The locking mechanism is further adapted to move the braking foot back overcenter into a disengaged nonbraking position when a second force is exerted on the foot pedal or when the caster wheel is moved rearwardly.

The foot pad includes a front portion and a rear portion, and the braking foot is releasably engaged with the caster wheel by exerting a downward force on the rear portion of the foot pad. The braking foot is disengaged from the caster wheel by exerting a downward force on the front portion of the foot pad or by moving the caster wheel in a rearward direction.

The lever is pivotably mounted to the brake housing by a lever pin connected to and extending between two inner side walls of the housing. In addition, the lever is pivotably connected to the connector arms by a lever-connector arm pin, and the connector arms are pivotably attached to the brake arm by a connector arm-brake arm pin. The brake arm itself is pivotably mounted to the brake housing by a brake arm-brake housing pin connected to and extending between the two inner side walls of the housing.

The hinge spring includes a coil, a first end and a second end, with the coil being wrapped around the connector arm-brake arm pin, the first end being connected to the lever-connector arm pin, and the second end being biased against the brake arm-brake housing pin. The braking foot is connected to the brake arm by a travel adjuster rod. The assembly further includes a tension pin connected to and extending between the two inner side walls of the housing, with the tension pin positioned to contact and stop the connector arms at their point of maximum upward travel.

In the preferred embodiment, the lever pin includes a plurality of spacers axially mounted on the pin for orienting the lever along the pin, and the brake arm-brake housing pin includes a plurality of spacers axially mounted on the pin for orienting the brake arm along the pin. If desired, a thin, washer-like spacer may be placed on the lever-connector arm pin between each connector arm and the lever, as well as the connector arm-brake arm pin between each connector arm and the brake arm.

The invention also is directed to a shopping cart having the foot brake assembly described above, as well as to a method of releasably braking a caster wheel. The method includes: providing a caster wheel foot brake assembly having an overcenter locking mechanism including a foot pedal and a braking foot, with the foot brake assembly being attached to a caster; and exerting a downward force on the foot pedal, thereby moving the braking foot overcenter in toggle fashion into a releasably locked position frictionally engaging the caster wheel. The method further includes disengaging the braking foot from the caster wheel by either exerting a downward force on the foot pedal or moving the caster wheel in a rearward direction, thereby moving the braking foot back overcenter into a nonbraking position.

This invention offers several benefits and advantages. For example, the brake assembly discussed above allows a user to disengage the brake simply by pulling back on the shopping cart or other item attached to the caster wheel. In addition, if it is not convenient for the user to pull back on the item, or if the user prefers to use a foot to disengage the brake, the user may release the caster wheel foot brake simply by pushing the foot down on the foot pedal, without having to place a toe on the underside of the pedal and lift upward. These and other benefits and advantages will become apparent to one of ordinary skill in the art upon studying the drawings and reading the detailed description of the invention.

DETAILED DESCRIPTION OF THE PREFERRED EMBODIMENT

Figure 1:
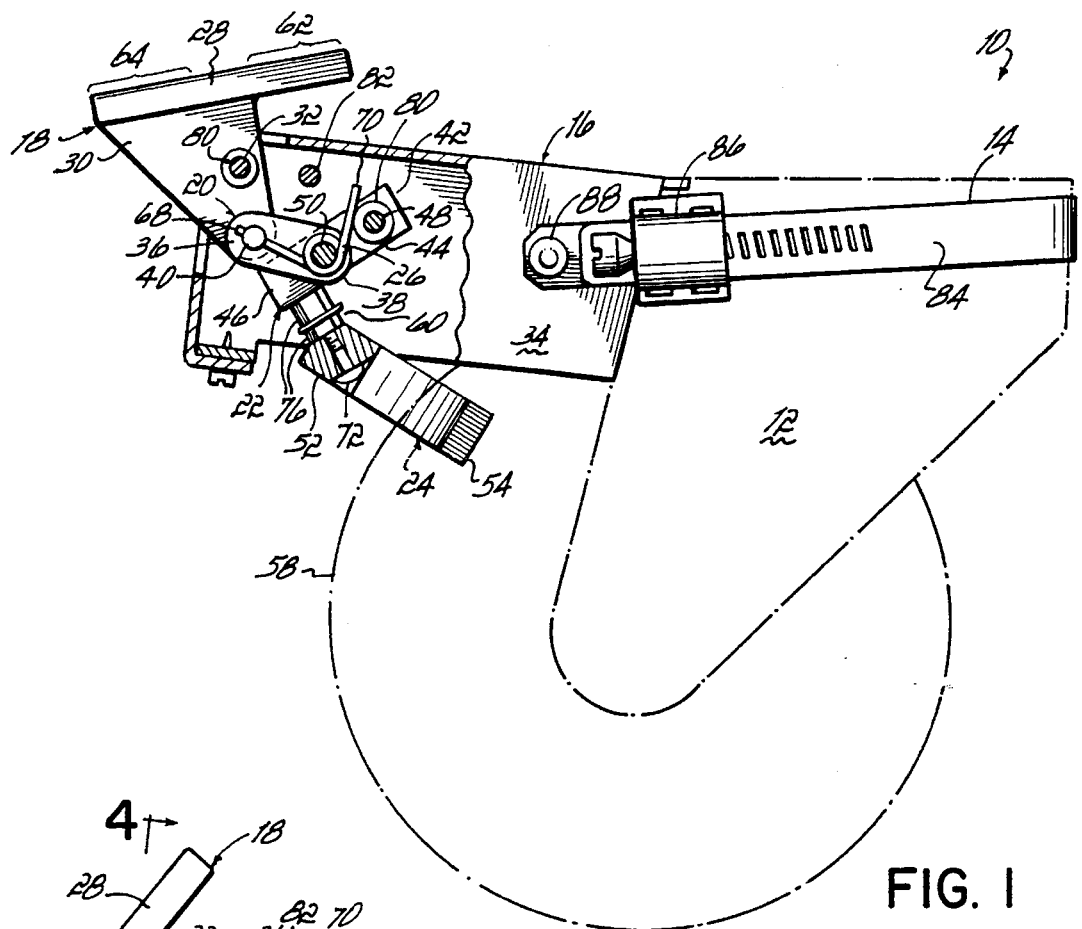
FIG. 1 is a side view of the preferred embodiment of the inventive caster wheel foot brake assembly attached to a caster, with a portion of the brake housing cut away to expose the interior components of the brake assembly (the foot brake assembly is shown in the disengaged position)
Figure 3:
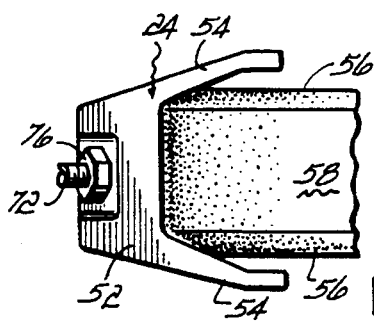
FIG. 3 is a top view of the foot brake engaged with the caster wheel, taken along line 3—3 of FIG. 2.

The preferred embodiment of the caster wheel foot brake assembly 10 is shown in FIG. 1, connected to a caster frame 12 by a mounting bracket system 14. As shown in the drawings, the foot brake assembly 10 includes a brake housing 16, a foot pedal 18, a pair of connector arms 20, a brake arm 22, a braking foot 24 and a hinge spring 26. The foot pedal 18 includes a foot pad 28 and a lever 30 protruding from the undersurface of the foot pad 28. The lever 30 is pivotably mounted to the brake housing by a lever pin 32 connected to and extending between the sidewalls 34 of the housing 16. Each of the connector arms 20 has a first end 36 and a second end 38, with the first end 36 of each connector arm 20 being pivotably connected to the lever 30 by a lever-connector arm pin 40. The brake arm 22 has a first end 42, a 15 middle region 44 and second end 46. The first end 42 is pivotably mounted to the brake housing 16 by a brake arm-brake housing pin 48 connected to and extending between the sidewalls 34 of the housing 16, and the middle region 44 of the brake arm 22 is pivotably attached to the second end 38 of each of the connector arms 20 by a connector arm-brake arm pin 50. As shown in FIG. 3, the braking foot 24 is generally U-shaped, having a base 52 and a pair of braking extensions 54 adapted to frictionally engage the sidewalls 56 of a caster wheel 58, and is connected to the second end 46 of the brake arm 22 by a travel adjuster rod 60.

Figure 2:
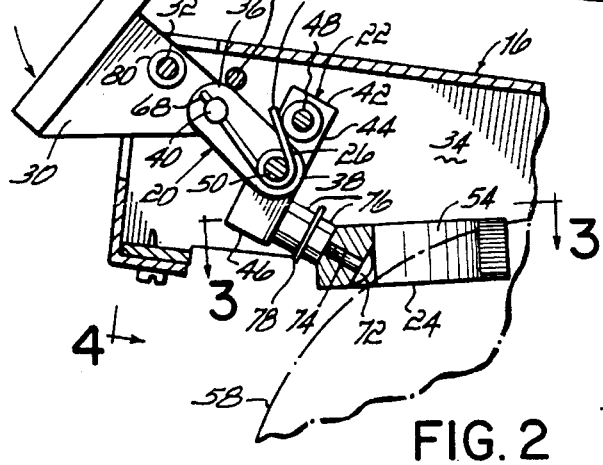
FIG. 2 is a side view showing a partial cutaway of the caster wheel foot brake assembly, with the foot brake in the engaged position.
Figure 4:
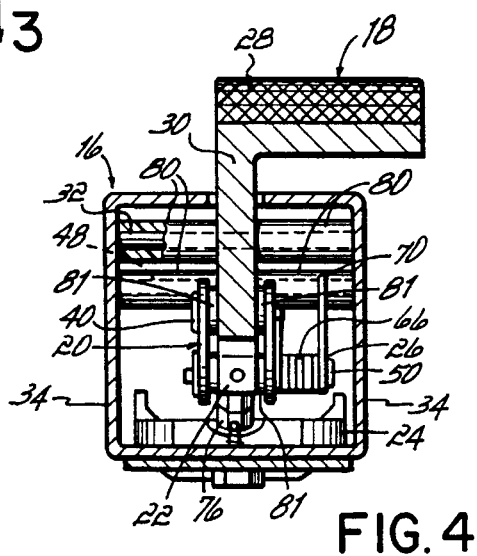
FIG. 4 is a cross sectional view taken along line 4—4 of FIG. 2.

More specifically, the foot pad 28 includes a front portion 62 and a rear portion 64. The hinge spring 26 includes a coil 66, a first end 68 and a second end 70, with the coil 6,15 being wrapped several times around one end of the connector arm-brake arm pin 50, the spring first end 68 being inserted through a hole drilled transversely through one end of the lever-connector arm pin 40, and the spring second end 70 being biased against one end of the brake arm-brake housing pin 48, as shown in FIGS. 1, 2 and 4. As shown in FIGS. 1 and 2, the travel adjustor rod 60 connecting the braking foot 24 to the brake arm 22 includes a screw or bolt 72. The screw or bolt 72 is run through an opening 74 in the base 52 of the braking foot 24 as shown in FIGS. 1–3, and threaded into the second end 46 of the brake arm 22. In addition, a plurality of lock nuts 76 and a locking washer 78 may be used to secure the travel 15 adjustor rod 60 to the brake arm 22 and to adjust the distance between the brake arm 22 and the braking foot 24 as shown in FIGS. 1 and 2.

The caster wheel foot brake assembly 10 also includes a plurality of spacers for aligning and lubricating several of the components. As shown in FIG. 4, a plurality of spacers 80 is axially mounted on the lever pin 32 as well as on the brake arm-brake housing pin 48 for orienting the lever 30 and brake arm 22 along their respective pins. In addition, if desired, a thin, washer-like spacer 81 may be mounted on the lever-connector arm pin 40 in between the lever 30 and connector arm 20 surfaces, as well as on the connector arm-brake arm pin 50 in between the brake arm 22 and connector arm 20 surfaces for added lubrication.

As shown in FIGS. 1 and 2, the caster wheel foot brake assembly 10 further includes a tension pin 82 connected to and extending between the inner sidewalls 34 of the housing 16. The tension pin 82 is positioned to contact and stop the connector arms 20 at their point of maximum upward travel. As shown in FIG. 1, the mounting bracket system 14 used to connect the caster wheel foot brake assembly 10 to the caster frame 12 includes a variable length strap 84 and a worm clamp 86 for tightening the strap 84 around the caster frame 12. The strap 84 and clamp 86 are connected to the assembly 10 by rivets 88 or similar fasteners.

In the preferred embodiment, the foot brake assembly is made of a metal such as steel or aluminum, and the spacers 80 are made of a high molecular weight plastic which has good lubricating properties.

FIG. 1 shows the caster wheel braking foot 24 in a disengaged position relative to the caster wheel 58. In order to engage the braking foot 24 with the caster wheel 58, a user simply pushes down on the rear portion 64 of the foot pedal 18, which causes the lever 30 to pivot about the lever pin 32. As the lever 30 begins to rotate, it moves the first end 36 of each of the connector arms 20 upward and overcenter until the connector arms 20 are stopped by the tension pin 82 as shown in FIG. 2. As the first ends 36 of the connector arms 20 move upward, the connector arms 20 exert an extending force on the brake arm 22, which causes the brake arm 22 to pivot about the brake arm-brake housing pin 48 and to extend outward toward the caster wheel 58. As shown in FIG. 2, as the second end 46 of the brake arm 22 moves outward, it drives the braking foot 24 into engagement with the caster wheel 58. In addition, the hinge spring 26 creates the necessary tension between the various elements to complete the overcenter locking mechanism.

With the inventive caster wheel foot brake assembly 10, a user has two different options in releasing the braking foot 24 from the caster wheel 58. Because of the overcenter tension created in the brake assembly 10, the user may disengage the braking foot 24 from the wheel 58 simply by pulling back on the shopping cart or other item attached to the caster. Alternatively, the user may disengage the braking foot 24 by pushing downward on the front portion 62 of the foot pedal 18. In either case,, the action introduced by the user causes the caster wheel foot brake assembly 10 to move back overcenter in toggle fashion into a disengaged non-braking position as shown in FIG. 1.

While the best mode for constructing the invention has been described herein in detail, those familiar with the art to which this invention relates will recognize various alternative ways of carrying out the invention. Accordingly, the scope of the invention is to be determined only by the following claims and their equivalents.

What is claimed is:

1. A caster wheel foot brake assembly, comprising:

a foot pedal having a foot pad and a lever protruding from the undersurface of said foot pad, said lever being pivotably mounted to a brake housing which is adapted to be attached to a caster;

a connector arm having a first end and a second end wherein said first end is pivotably connected to said lever;

a brake arm having a first end, a middle region and a second end, said first end being pivotably mounted to said brake housing, said middle region being pivotably attached to said second end of said connector arm;

a braking foot having a plurality of braking extensions adapted to frictionally engage a caster wheel, said braking foot being connected to said second end of said brake arm; and a hinge spring for exerting an angular force between said connector arm and said brake arm;

said foot pedal, connector arm, brake arm, braking foot and hinge spring forming an overcenter locking mechanism such that when said brake housing is attached to said caster, said locking mechanism being adapted to move said braking foot overcenter in toggle fashion into a releasably locked braking position frictionally engaging said caster wheel upon application of a first force to said foot pedal, and said locking mechanism being further adapted to move said braking foot back overcenter into a disengaged nonbraking position upon application of a second force exerted on said foot pedal and upon application of a rearward movement of said caster wheel.

2. The assembly of claim 1 wherein said foot pad includes a front portion and a rear portion, said braking foot being releasably engaged with said caster wheel by exerting a downward force on said rear portion of said foot pad, said braking foot being disengaged from said caster wheel by exerting a downward force on said front portion of said foot pad or by moving said caster wheel in a rearward direction.

3. The assembly of claim 1 wherein said lever is pivotably mounted to said brake housing by a lever pin connected to and extending between two inner sidewalls of said housing.

4. The assembly of claim 3 wherein said lever is pivotably connected to said connector arm by a lever-connector arm pin, said connector arm is pivotably attached to said brake arm by a connector arm-brake arm pin, and said brake arm is pivotably mounted to said brake housing by a brake arm-brake housing pin connected to and extending between said two inner sidewalls of said housing.

5. The assembly of claim 4 wherein said hinge spring includes a coil, a first end and a second end, said coil being wrapped around said connector arm-brake arm pin, said spring first end being connected to said lever-connector arm pin, and said spring second end being biased against said brake arm-brake housing pin.

6. The assembly of claim 5 wherein said braking foot is connected to said brake arm by a travel adjuster rod.

7. The assembly of claim 6 further including a tension pin connected to and extending between said two inner sidewalls of said housing, said tension pin positioned to contact and stop said connector arm at said connector arm's point of maximum upward travel.

8. The assembly of claim 7 further including a second connector arm adjacent to and parallel with said connector arm and pivotably connected to said lever and said brake arm.

9. The assembly of claim 8 wherein said lever pin includes a plurality of spacers axially mounted on said pin for orienting said lever along said pin.

10. The assembly of claim 9 wherein said lever-connector arm pin includes a plurality of spacers axially mounted on said pin for spacing said connector arms from said lever, and said connecter arm-brake arm pin includes a plurality of spacers axially mounted on said pin for spacing said connector arms from said brake arm.

11. The assembly of claim 10 wherein said brake arm-brake housing pin includes a plurality of spacers axially mounted on said pin for orienting said brake arm along said pin.

12. A shopping cart with a foot brake, comprising:

a shopping cart; and a shopping cart foot brake assembly, including:

a foot pedal having a foot pad and a lever protruding from the undersurface of said foot pad, said lever pivotally mounted to a brake housing which is adapted to be attached to a caster;

a connector arm having a first end and a second end wherein said first end is pivotably connected to said lever;

a brake arm having a first end, a middle region and a second end, said first end being pivotably mounted to said brake housing, said middle region being pivotably attached to said second end of said connector arm;

a braking foot having a plurality of braking extensions adapted to frictionally engage a caster wheel, said braking foot connected to said second end of said brake arm; and a hinge spring for exerting an angular force between said connector arm and said brake arm;

said foot pedal, connector arm, brake arm, braking foot and hinge spring forming an overcenter locking mechanism within said brake housing which is attached to said caster, said locking mechanism adapted to move said braking foot overcenter in toggle fashion into a releasably locked braking position frictionally engaging said caster wheel upon application of a first force to said foot pedal, said locking mechanism further adapted to move said braking foot back overcenter into a disengaged nonbraking position upon application of a second force exerted on said foot pedal and upon application of a rearward movement of said caster wheel.

13. A method of releasably braking a caster wheel, comprising the steps of:

providing a caster wheel foot brake assembly having an overcenter locking mechanism including a foot pedal and a braking foot, said foot brake assembly being attached to a caster having a caster wheel;

releasably engaging said braking foot with said caster wheel by exerting a downward force on said foot pedal, thereby moving said locking mechanism overcenter into a releasably locked braking position; and disengaging said braking foot from said caster wheel either by moving said caster wheel in a rearward direction or by exerting a downward force on said foot pedal, thereby moving said locking mechanism back overcenter into a nonbraking position, said locking mechanism adapted to move into a nonbraking position upon rearward movement of said caster wheel and upon exertion of a downward force on said foot pedal.

14. A caster wheel foot brake assembly, comprising:

an actuator, an overcenter linkage operatively connected to said actuator, and a braking mechanism operatively connected to said overcenter linkage, said actuator being adapted to receive a braking force exerted by a user;

said linkage being movable overcenter in toggle fashion in response to said braking force from said actuator;

said braking mechanism being responsive to said overcenter movement of said linkage to frictionally engage a caster wheel;

said linkage further being responsive and operative to move back overcenter in toggle fashion upon application of a second force from said actuator and upon application of a release force from said braking mechanism in response to said caster wheel being moved in a rearward direction, said braking mechanism being responsive to said movement back overcenter of said linkage to disengage from said caster wheel.

* * * * *